United States Patent [19]
Bott

[11] 4,442,961
[45] Apr. 17, 1984

[54] LOAD CARRIER

[76] Inventor: John A. Bott, 931 Lakeshore Dr., Grosse Pointe, Mich. 48236

[21] Appl. No.: 365,448

[22] Filed: Apr. 5, 1982

Related U.S. Application Data

[63] Continuation-in-part of Ser. No. 213,675, Dec. 5, 1980, abandoned.

[51] Int. Cl.³ ............................................. B60P 3/06
[52] U.S. Cl. ............................. 224/42.03 B; 224/321; 224/324; 211/20; 211/22
[58] Field of Search ................. 224/324, 321, 42.03 B, 224/309, 310, 319, 322, 323; 211/19, 20, 22

[56] References Cited

U.S. PATENT DOCUMENTS

| | | | |
|---|---|---|---|
| 2,576,222 | 11/1951 | Hill | 224/42.03 B X |
| 2,803,349 | 8/1957 | Talbot | 211/22 |
| 3,204,839 | 9/1965 | Yuda et al. | 224/42.03 B |
| 3,687,318 | 8/1972 | Casey et al. | 214/450 |
| 3,843,001 | 10/1974 | Willis | 224/42.03 B X |
| 3,848,784 | 11/1974 | Shimano et al. | 211/22 X |
| 3,861,533 | 1/1975 | Radek | 211/20 |
| 3,901,421 | 8/1975 | Kalieki et al. | 224/29 R |
| 3,931,919 | 1/1976 | Gerber et al. | 211/22 X |
| 3,994,425 | 11/1976 | Graber | 224/29 R |
| 4,015,760 | 4/1977 | Bott | 224/324 |
| 4,039,106 | 8/1977 | Graber | 224/42.03 B X |
| 4,132,335 | 1/1979 | Ingram | 224/324 |

*Primary Examiner*—Steven M. Pollard
*Attorney, Agent, or Firm*—Harness, Dickey & Pierce

[57] ABSTRACT

A vehicle load carrying device including a primary load carrying structure for carrying general type loads such as luggage and the like, above a vehicle surface, such as a hood or roof, and a bicycle carrier which can be removably assembled with the primay load carrying structure to facilitate the transport of bicycles in an upright position above said surface. The primary load carrying structure includes a set of laterally spaced longitudinal rails and a pair of transverse utility bar assemblies which are longitudinally positionable along and removably securable to a pair of the rails for supporting loads. The bicycle carrier includes a brace member which is removably assembled between one utility bar assembly and the frame of a bicycle to secure the bicycle against lateral movement relative to said surface, and a wheel fixing structure which receives the bicycle wheels, locates them in planar alignment, and secures the wheels and the bicycle against longitudinal movement.

50 Claims, 14 Drawing Figures

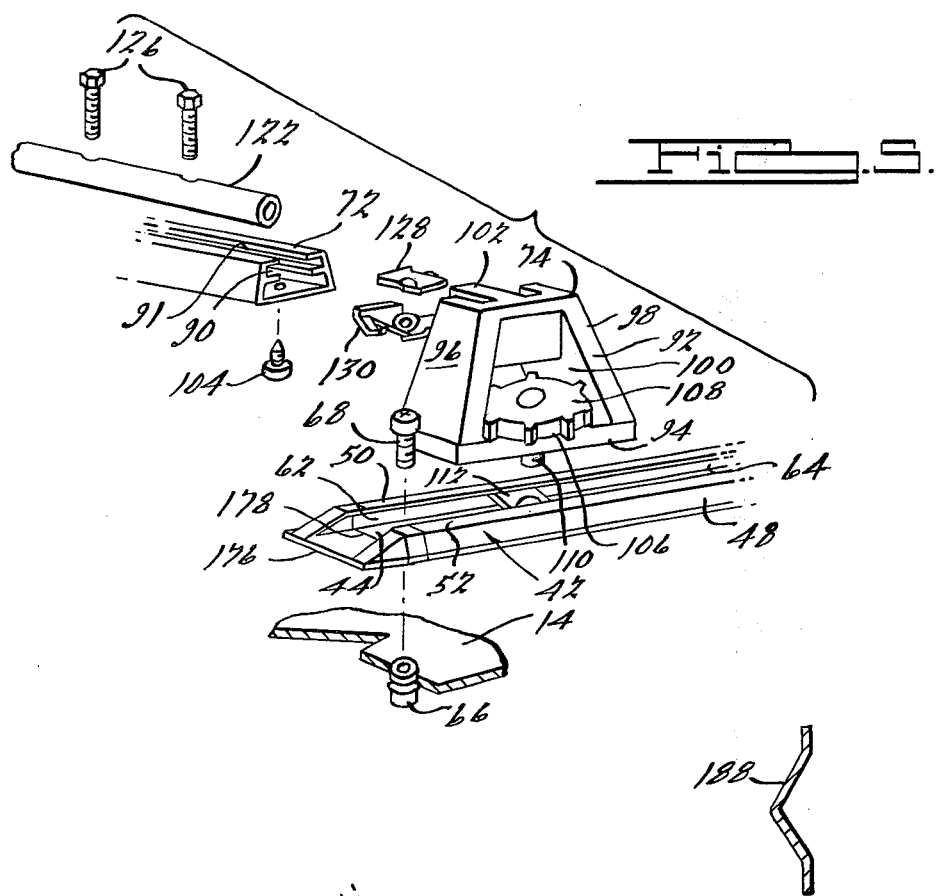
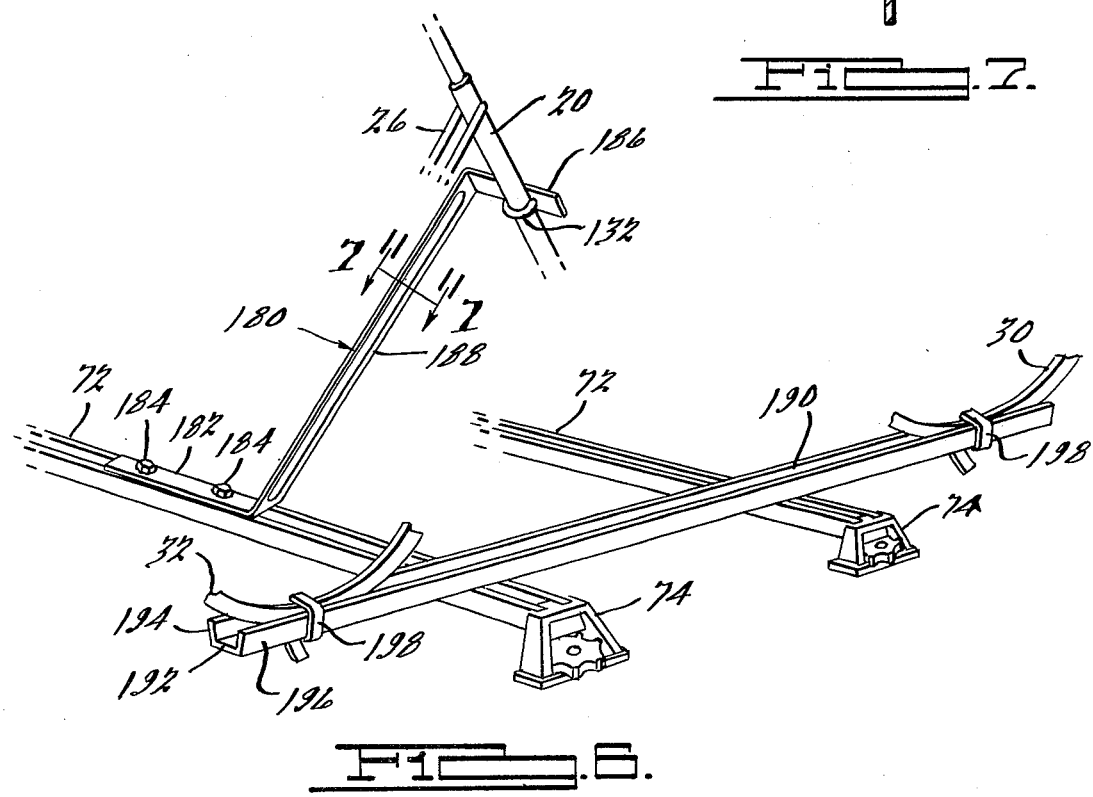

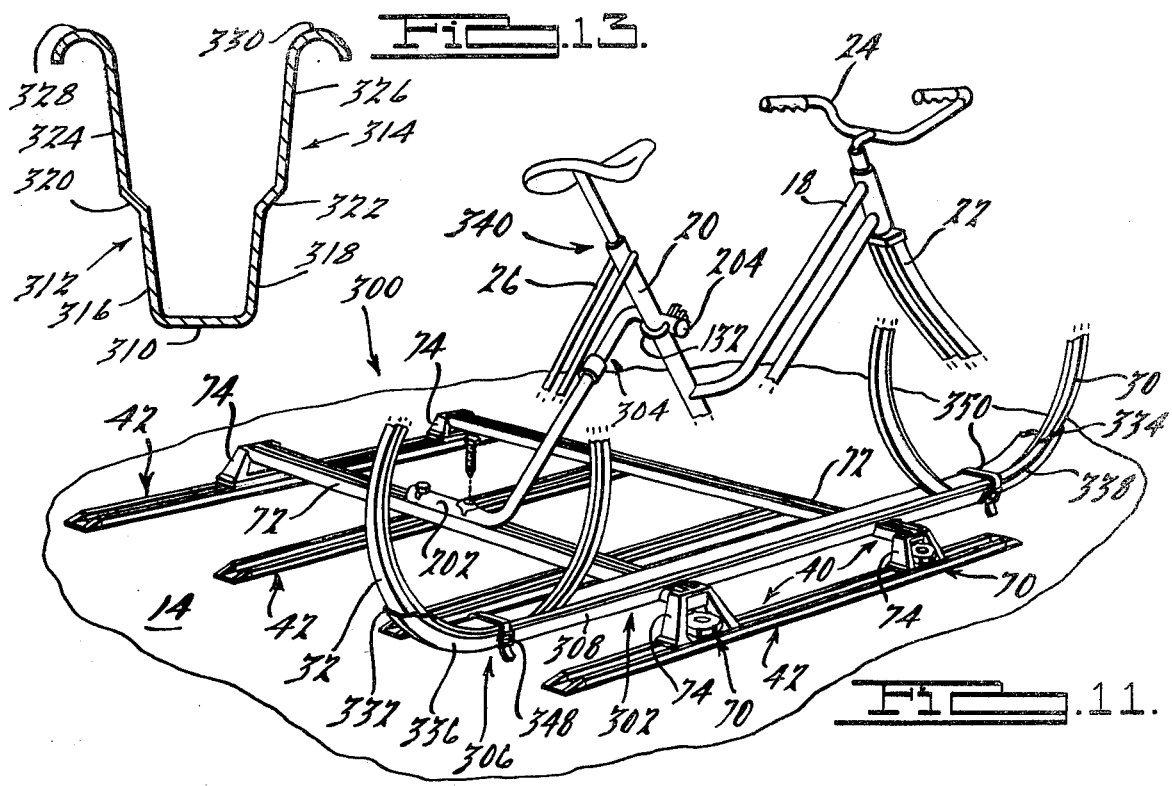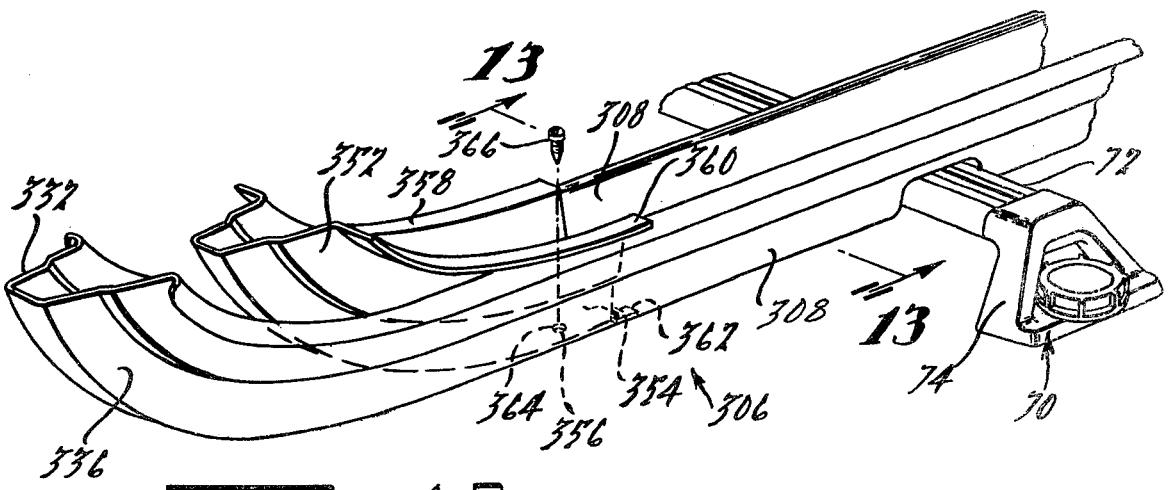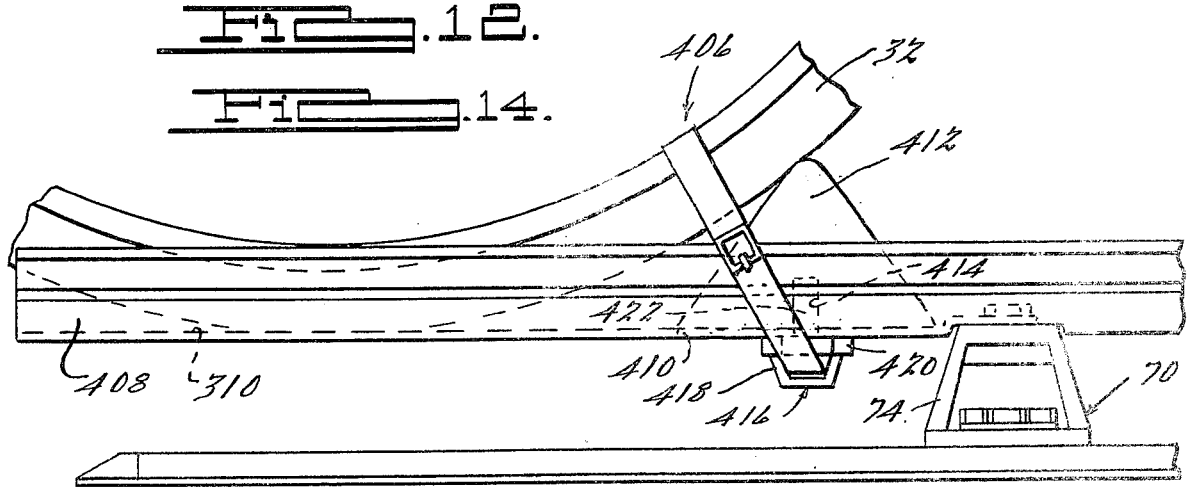

LOAD CARRIER

CROSS-REFERENCE TO RELATED APPLICATION

The present application is a continuation-in-part of Ser. No. 213,675, filed Dec. 5, 1980, now abandoned.

BACKGROUND AND SUMMARY OF THE INVENTION

The present invention relates to devices for securing and supporting bicycles and other types of loads for transport by an automotive or other vehicle, and more particularly, to the combination of a primary load supporting structure for securing and supporting loads such as luggage and the like, and a bicycle carrier for use in combination with the primary load supporting structure for securing and supporting one or more bicycles in an upright position for transport by a vehicle.

A wide variety of vehicle luggage or other type load carrying devices are generally well known. However, such devices are not well-suited for utilization as a bicycle carrier. On the other hand, there exist many prior devices which can be assembled upon a generally horizontal surface of a vehicle, such as a roof or hood, for securing one or more bicycles for transport by the vehicle. However, such prior known devices are not well-suited for carrying other loads, and their utility is generally limited to bicycle transport.

Moreover, prior known vehicle bicycle carriers for transporting bicycles in an upright position possess certain deficiencies and disadvantages which further limit their utility. More specifically, such devices have required the mounting of several longitudinally spaced laterally extending cross-members above such a vehicle surface, as well as the assembly of a separate multi-piece bicycle supporting structure for support by and between the cross-members in order to yield an effective bicycle carrying device. Such devices therefore require complicated, tedious and time consuming assembly procedures. In addition, the bicycle supporting structures of these devices have been of generally complicated configurations which require multiple step forming processes, and take up unnecessary space during shipment and use. While some of these bicycle supporting structures have been designed for disassembly for shipment, such designs contribute to the previously mentioned assembly problems. These structures also occupy a substantial amount of vertical space above a vehicle when they are not being utilized to carry a bicycle. They can therefore present an undesired hazard in low vertical clearance areas, such as garage entries or around low hanging tree branches or limbs, and create additional wind resistance which reduces vehicle efficiency. Avoidance of these problems can be achieved only by tedious and time consuming disassembly and removal of these prior devices from the vehicle.

The complicated configurations of these prior bicycle supporting structures have resulted because they have been designed to effect a rigid self-supporting structure into which a bicycle frame may be secured to prevent longitudinal and lateral movement of the bicycle. While some of these prior devices have included longitudinally extending channels for receiving the front and rear wheels of a bicycle, these channels, at most, serve only to prevent turning of such wheels, and the bicycle is secured against longitudinal and lateral movement solely by the supporting structure of such devices. In order to function in this manner, such prior devices have required fixed, rigid supporting structures having limited or no positioning capability, either longitudinally or laterally along the vehicle surface. They therefore possess limited adaptability and are not well-suited to accommodate a variety of space needs.

It is, therefore, desirable to provide a load carrying device which can be assembled upon a vehicle in a simple, quick and efficient manner for securing and supporting bicycles in an upright position for transport by the vehicle. It is also desirable to provide such a device which has general load carrying capabilities, so that it can be utilized to carry bicycles or other loads, or both, as desired. It is moreover desirable to provide such a device that includes a simplified bicycle supporting structure which can be manufactured more efficiently than prior known devices, and which takes up less space during shipment and use. It is further desirable to provide such a structure which can be easily collapsed and retained on the vehicle to avoid vertical clearance problems and to reduce wind resistance when the structure is not being utilized to transport bicycles. It is additionally desirable to provide such a device which possesses longitudinal and lateral positioning capabilities to allow bicycles and other loads to be positioned above a vehicle surface as desired for transport by the vehicle.

The device according to the present invention includes a primary load carrying structure which includes a plurality of laterally spaced longitudinally extending rails which are attachable to a horizontal vehicle surface, such as a hood or roof. The primary load carrying structure also includes several laterally extending cross-members or utility bars which are removably securable to and movable along a pair of the longitudinally extending rails. These utility bars are operative to support a variety of loads, such as luggage or the like.

The device also includes a bicycle carrier which can be removably assembled with the primary load carrying structure to facilitate the transport of bicycles in an upright position by the vehicle. The bicycle carrier includes a one-piece bicycle supporting or brace member which can be removably assembled between a single cross-member or utility bar and a frame member of a bicycle to laterally support and secure the bicycle. The bicycle carrier also includes a wheel fixing structure which is operative to engage and fix the front and rear wheels of the bicycle against movement. In one version, the wheel fixing structure includes a pair of shoes which are removably assembled upon one of the longitudinal rails at longitudinally spaced locations for receiving and locating the bicycle wheels, and clamping assemblies for retaining the wheels within the shoes. In a second version, the wheel fixing structure includes a longitudinally extending channel which is removably assembled upon two cross-members or utility bars for receiving and locating both bicycle wheels, and clamping assemblies for retaining the wheels within the channel. In another version, the wheel fixing structure includes both a longitudinally extending channel for receiving and locating both bicycle wheels which is removably assembled upon two cross members or utility bars and a pair of shoes which may or may not be removeably assembled at opposite ends of the longitudinally extending channel to aid in receiving and locating the bicycle wheels, along with assemblies for retaining the wheels within the channel. In all cases, the brace member supports and secures the bicycle against lateral movement, while the wheel fixing structure secures and supports the bicycle against longitudinal movement. The brace member can be provided in a form which can be quickly and efficiently collapsed and retained on the vehicle in a low profile configuration when the bicycle carrier is not being utilized to transport bicycles.

With this design, the present invention eliminates the necessity of providing a complicated, rigid and self-supporting bicycle supporting structure extending between a pair of cross-members, such as taught by prior known devices. Instead, the bicycle carrier provides a structure which secures and supports a bicycle at three distinct points, and cooperates with the bicycle itself to create a stable and rigid structure. These features also provide a bicycle carrier which is more adaptable, easier to manufacture and assemble, and which requires less space for shipment and use than prior known devices. It should be noted that the design of each utility bar allows the brace member and the channel to be laterally positioned as desired. Similarly, the design of the longitudinal rails enables longitudinal positioning of the shoes according to user needs. These additional features, along with the positioning capability of the utility bars, present the user with a device that can be positioned upon a vehicle surface as desired for supporting and securing bicycles for transport by the vehicle. Moreover, these positioning capabilities provide the user with a device that can be utilized for locating and transporting bicycles, other types of loads, or both, as desired. In addition, the device provides the user with a bicycle carrier which can be simply and efficiently placed in a low profile storage configuration on the vehicle, so that wind resistance and vertical clearance problems can be avoided without completely removing the carrier from the vehicle.

The above and other features of the invention will become apparent from a reading of the detailed description of the preferred embodiments which make reference to the following set of drawings, in which:

BRIEF DESCRIPTION OF THE DRAWINGS

FIG. 5 is an exploded perspective view showing the assembly relationship of particular elements of the embodiment illustrated in FIG. 1;

FIG. 6 is a perspective view of second embodiments of a brace member and a wheel fixing structure in accordance with the present invention;

FIG. 7 is a sectional view taken in the direction of Line 7—7 of FIG. 6;

FIG. 11 is an elevated perspective view of another alternative embodiment of a structure in accordance with the present invention;

FIG. 12 is an enlarged elevated perspective view of a portion of the wheel fixing structure of FIG. 11;

FIG. 13 is a transverse sectional view along the line 13—13 of FIG. 12; and

FIG. 14 is an enlarged elevated side view of a further alternative embodiment of a structure in accordance with the present invention.

DETAILED DESCRIPTION OF THE PREFERRED EMBODIMENTS

Figure 1:
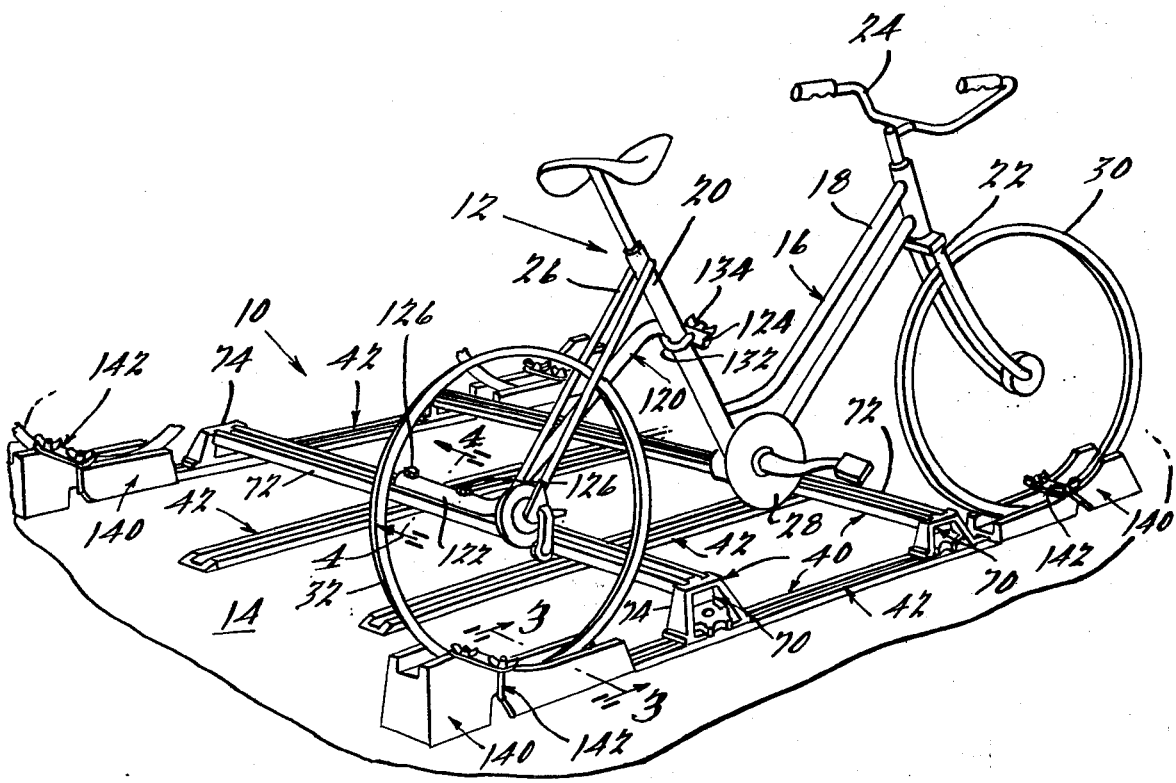
FIG. 1 is a perspective view of a primary load carrying structure and bicycle carrier in accordance with one embodiment of the present invention.

Referring now to the drawings, an embodiment of a load carrier incorporating the teachings of the present invention is shown generally at 10. FIG. 1 illustrates the load carrier 10 as utilized to secure and support a bicycle 12 for transport above a generally horizontal surface 14 of a vehicle, such as a roof or hood. The bicycle 12 is of a standard configuration, and includes a frame 16 which is defined by a front frame member 18 and a rear frame member 20. The bicycle 12 also includes a front fork assembly 22, a steering assembly 24, a rear fork assembly 26, and a pedal assembly 28 of standard configuration. As shown in FIG. 1, the bicycle 12 also includes a front wheel 30 which is carried upon the front fork assembly 22. A rear wheel 32 is carried upon the rear fork assembly 26 and is operative to be driven by the pedal assembly 28 by way of a standard chain drive (not shown).

Figure 3:
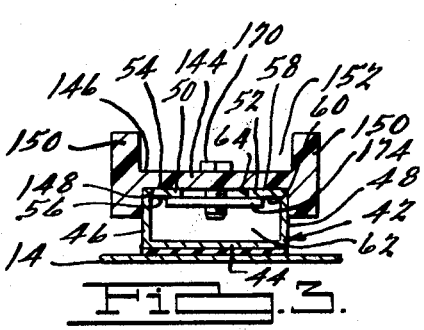
FIG. 3 is a sectional view taken in the direction of Line 3—3 of FIG. 1.

The load carrier 10 includes a primary load carrying structure 40 which can be utilized to secure and support general types of loads, such as luggage and the like, in a conventional manner. As shown in FIG. 1, primary load carrying structure 40 includes a set of four longitudinally extending rail members 42 which are spaced laterally along surface 14. As best shown in FIG. 3, each rail member 42 is formed to define a base 44 and a pair of upstanding spaced parallel sidewalls 46 and 48. The sidewalls 46 and 48 terminate in a pair of laterally inwardly extending co-planar flanges 50 and 52, respectively. As illustrated in FIG. 3, flange 50 defines a longitudinally extending upper clamping surface 54 and a similarly extending lower clamping surface 56. Flange 52 likewise defines an upper clamping surface 58 and a lower clamping surface 60. As so formed, each rail member 42 defines a longitudinally extending channel 62, and a longitudinally extending slot or access opening 64 for permitting access to channel 62. Each rail member 42 can be attached to surface 14 in any desired manner. However, in the preferred embodiment of the invention, each rail member 42 is attached to surface 14 by installing a series of riv-nuts 66 at laterally aligned longitudinally spaced locations along surface 14 and passing a like number of threaded fastening elements 68 through the base 44 of each rail member 42 and into riv-nuts 66 in the manner illustrated in FIG. 5.

Figure 4:
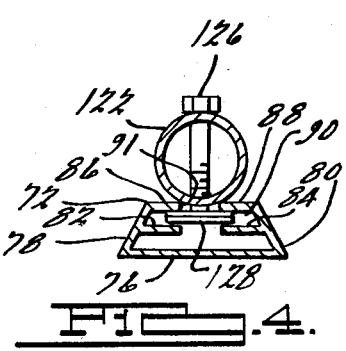
FIG. 4 is a sectional view taken in the direction of Line 4—4 of FIG. 1.

The primary load carrying structure 40 also includes a pair of utility bar assemblies 70 such as shown in FIG. 1. Each of these utility bar assemblies 70 includes a laterally extending elongated cross-member 72 which is assembled with and supported by stanchion assemblies 74 adjacent each of its ends. The cross-members 72 may be of any suitable construction, but preferably are of the cross-section illustrated in FIGS. 4 and 5. Referring specifically to FIG. 4, each cross-member 72 is formed to define a bottom portion 76 and a pair of spaced upwardly converging sidewalls 78 and 80. Each cross-member 72 also includes two pairs of laterally inwardly extending, vertically spaced flange portions, indicated in FIG. 4 at 82, 84, 86 and 88, which together define an elongated track or channel 90 which is coextensive with the length of the cross-member 72. Flanges 86 and 88 also cooperate to define an elongated slot or access opening 91 which allows access to channel 90 for the purposes described more fully hereinafter.

As shown most readily in FIG. 5, each stanchion assembly 74 is operable to be assembled with an end of a cross-member 72 and with a longitudinal rail member 42. For this purpose, each stanchion assembly 74 includes a stanchion body 92 which is formed to define a base 94 and a pair of upwardly converging sidewalls 96 and 98 which cooperate with the base 94 to define a central recess 100 within stanchion body 92. Each stanchion body 92 also defines a laterally projecting mounting portion 102 which is telescopically received within an adjacent end of a cross-member 72 and removably assembled therewith by a fastening element 104 such as shown in FIG. 5. To facilitate assembly of each stanchion assembly 74 with a rail member 42, each stanchion assembly 74 includes a fastening element 106 which defines an adjusting knob 108 disposed within recess 100, and an externally threaded stud 110 which extends through base 94 and which can be turned by way of knob 108. In addition, threaded clamping plates 112 can be provided within channel 62 of the rail member 42 to threadably receive studs 110 within channel 62 through access opening 64.

These features allow each utility bar assembly 70 to be removably assembled to a laterally spaced pair of longitudinal rail members 42 as shown in FIG. 1. In this connection, assembly of each utility bar assembly 70 is accomplished by suitably locating clamping plates 112 within channel 62 along each rail member 42 and thereafter utilizing fastening elements 106 to assemble stanchion assemblies 74 therewith. When so assembled, adjusting knobs 108 can be turned so that studs 110 will cooperate with clamping plates 112 to draw clamping plates 112 against lower clamping surfaces 56 and 60 of flanges 50 and 52, and base 94 of each stanchion assembly 74 against upper clamping surfaces 54 and 58 to create a rigid assembly of utility bar assembly 70 with each rail member 42. Removal of each utility bar assembly 70 can be accomplished by turning each respective adjusting knob 108 to back off each fastening element 106 accordingly. It should be noted that the dimensions of clamping plates 112 allow them to be moved longitudinally within channels 62 and positioned as desired. This feature enables assembly and disassembly of each utility bar assembly 70 at a variety of longitudinal locations along surface 14, as well as longitudinal positioning of each utility bar assembly 70 as desired for supporting and securing a variety of loads for transport by the vehicle.

The load carrier 10 also includes a bicycle carrier which is operative to be assembled with the primary load carrying structure 40 to facilitate the transport of a bicycle in an upright position above surface 14 for transport by the vehicle. This bicycle carrier includes an elongated one-piece bicycle supporting or brace member 120 which is formed from a hollow piece of tubing to define a foot portion 122 at one end and a frame engaging portion 124 at its opposite end. As so formed, the brace member 120 is operative to be positioned to extend between the rear frame member 20 of bicycle 12 and a cross-member 72 in the manner illustrated in FIG. 1.

When so positioned, the foot portion 122 can be removably assembled with cross-member 72 by a pair of threaded male fastening elements 126 which are inserted through suitably sized diametrically opposed holes in foot portion 122, and through access opening 91 into channel 90. To facilitate such assembly, threaded clamping plates 128 such as shown in FIGS. 4 and 5 are provided within channel 90 of cross-member 72 for effecting a threaded assembly with each fastening element 126. Tightening of fastening elements 126 will draw clamping plates 128 and foot portion 122 against flanges 86 and 88 of cross-member 72 to effect a secure and rigid assembly therewith. Each clamping plate 128 is of a size suitable to allow movement and positioning thereof along channel 90 prior to assembly of foot portion 122 with cross-member 72. This feature enables lateral positioning of brace member 120 relative to the primary load carrying structure 40 and surface 14 as desired. On the other hand, retaining elements 130 such as shown in FIG. 5 can be provided to prevent sliding movement of clamping plates 128 along cross-member 72 when fastening elements 126 are disengaged therefrom. Assembly of frame engaging portion 124 with rear frame member 20 of bicycle 12 is achieved by assembling a J-bolt 132 about rear frame member 20, passing the threaded portion of J-bolt 132 through a pair of suitably sized diametrically opposed holes in frame engaging portion 124, and assembling a wing nut 134 therewith. The wing nut 134 can thereafter be tightened to achieve a clamped assembly of frame engaging portion 124 with rear frame member 20 of bicycle 12 as shown in FIG. 1.

Figure 2:
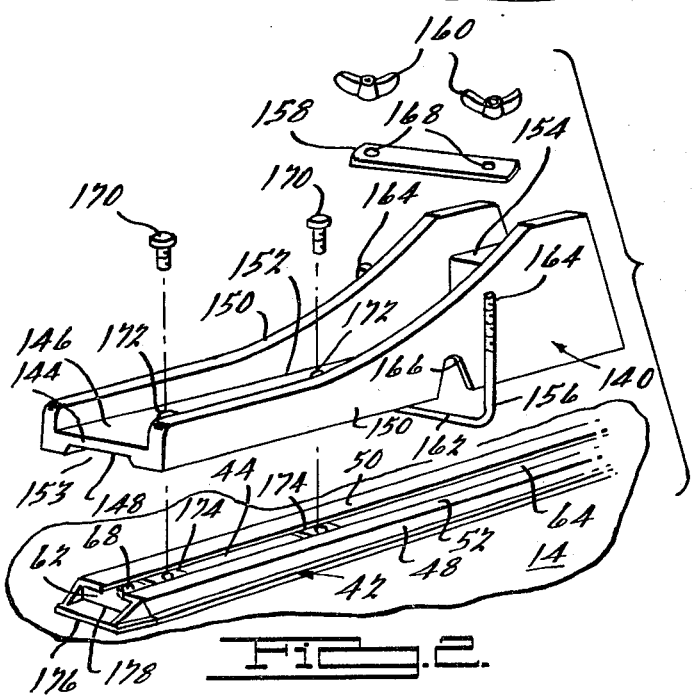
FIG. 2 is an exploded perspective view of a wheel fixing structure of the embodiment illustrated in FIG. 1.

The bicycle carrier also includes a wheel fixing structure defined by a pair of wheel receiving shoes 140 and associated wheel clamping assemblies 142, such as shown in FIG. 1. The wheel receiving shoes 140 are adapted to be removably assembled along a rail member 42 at longitudinally spaced locations therealong for receiving front and rear wheels 30 and 32 of the bicycle 12 and locating them in a generally planar alignment. To achieve this purpose, each shoe 140 is formed to include an elongated base 144 which defines a wheel engaging face 146 along its upper surface and rail engaging face 148 along its bottom surface. Each shoe 140 also includes a pair of spaced generally vertical sidewalls 150 having sloped profiles such as shown in FIG. 2. Sidewalls 150 cooperate with wheel engaging face 146 of base 144 to define a longitudinal channel 152 for receiving and locating a bicycle wheel, and with rail engaging face 148 to define a longitudinal recess 153 for receiving a rail member 42 in the manner described more fully below. Each shoe 140 is also provided with an abutment portion 154 at one end of channel 152 which serves as a stop to longitudinally locate a bicycle wheel within channel 152. The opposite end of channel 152 is, however, open to facilitate movement of a bicycle wheel into and out of channel 152 prior to and after transport of the bicycle 12.

Once a bicycle wheel has been received and located within channel 152, the above-mentioned wheel clamping assemblies 142 can be utilized to secure the wheel within channel 152 against longitudinal movement. Each clamping assembly 142 includes a U-bolt 156, a clamping plate 158 and a pair of wing nuts 160 such as shown in FIG. 2. Each U-bolt 156 defines a bight portion 162 and a pair of spaced generally parallel externally threaded studs 164, and has a width greater than the overall width of shoes 140. This feature allows the bight portion 162 of each U-bolt 156 to be installed within a laterally extending slot 166 in each shoe 140 so that threaded studs 164 will extend above the sidewalls 150. Clamping plates 158 are sized to allow lateral insertion through the spokes of a bicycle wheel and are provided with suitably spaced and sized holes 168 which allow clamping plates 158 to be assembled with U-bolts 156 by insertion of threaded studs 164 therethrough. A bicycle wheel can thereafter be fixed against longitudinal movement within each shoe 140 by assembling wing nuts 160 upon studs 164 and tightening them against clamping plates 158 in a conventional manner.

Assembly of shoes 140 with a rail member 42 is achieved in the following manner. Each shoe 140 is first aligned along the rail member 42 so that the rail member 42 can be received within recess 153 for engagement of rail engaging face 148 with the upper clamping surfaces 54 and 58 of flanges 50 and 52, respectively. Threaded fastening elements 170 are then inserted through a pair of longitudinally spaced holes 172 in base 144 of each shoe 140, through access opening 64 in rail member 42, and into a pair of suitably located threaded clamping plates 174 disposed within channel 62 of rail member 42. The fastening elements 170 can thereafter be tightened in a conventional manner. Such tightening will draw each clamping plate 174 against the lower clAmping surfaces 56 and 60 of flanges 50 and 52, as well as rail engaging face 148 against upper clamping surfaces 54 and 58, and thereby fix each shoe 140 in an assembled position along rail member 42. To facilitate installation of clamping plates 174, as well as the previously described clamping plates 112, within channel 62, each rail member 42 is provided with end caps 176 which define access openings 178 at each longitudinal end of channel 62 through which clamping plates 174 and 112 can be inserted into channel 62.

The above-described features of the invention provide the user with a bicycle carrier which can be simply and easily assembled with the primary load carrying structure 40 for transporting a bicycle 12 in an upright position above surface 14 of the vehicle. To utilize the bicycle carrier, the user can choose an appropriate longitudinal rail member 42 to which he desires to assemble wheel receiving shoes 140. He can then install a U-bolt 156 within slot 166 of each shoe 140 and thereafter locate clamping plates 174 and shoes 140 properly receiving and locating front and rear wheels 30 and 32 of bicycle 12. Fastening elements 170 can thereafter be installed to affix each shoe 140 at the desired location along rail member 42. The bicycle 12 can then be positioned for receipt of wheels 30 and 32 within channels 152 of each shoe 140 and the wheel clamping assemblies 142 activated in the previously described manner. A utility bar assembly 70 can thereafter be longitudinally positioned to allow foot portion 122 of brace member 120 to be properly assembled therewith, and frame engaging portion 124 to be properly assembled with rear frame member 20 of bicycle 12 in the previously described manner. It should be noted that this is only one method of utilizing the bicycle carrier, and that the previously described assembly steps can be varied as desired to achieve the resulting configuration shown in FIG. 1.

As is readily apparent, the bicycle carrier of this embodiment provides a structure which supports and secures bicycle 12 at three distinct points: specifically, rear frame member 20 and front and rear wheels 30 and 32. In this fashion, the bicycle carrier cooperates with the bicycle 12 itself to create a stable and rigid structure which is secured against both lateral and longitudinal movement relative to the vehicle. In particular, when the brace member 120 is assembled in the above-noted manner, it extends laterally of the bicycle 12 between cross-member 72 and rear frame member 20 to secure the entire structure against a lateral movement. On the other hand, the shoes 140 and clamping assemblies 142 secure the front and rear wheels 30 and 32 of bicycle 12 against longitudinal movement at points disposed longitudinally on either side of rear frame member 20, brace member 120 and cross-member 72.

This design therefore eliminates the necessity of providing a complicated, rigid and self-supporting structure extending between a pair of cross-members for carrying a bicycle such as taught by prior known devices. Instead, the invention provides a bicycle carrier having a configuration which cooperates with the bicycle itself to create a simplified and yet rigid and secure structure for transport. In addition, the bicycle carrier can be manufactured and assembled more easily and efficiently than prior known devices. In particular, the brace member 120 can be formed from a single piece of metal tubing in a simple and efficient manner, and the shoes 140 can be made by an injection molding process. This feature reduces the material, manufacturing and assembly costs associated with the complicated multi-piece structures of prior devices. Moreover, the shoes 140 and the one-piece brace member 120 utilize less space for carrying bicycles than known prior devices, and therefore provide a less bulky device for shipment and use.

The above-described features also provide a bicycle carrier which can be positioned in a variety of ways along surface 14 to accommodate various space and load carrying needs of the user. In particular, the shoes 140 can be positioned as desired along any longitudinal rail member 42 and removably assembled thereto. (It should be noted that the orientation of shoes 140 can be reversed in some applications so that they are located between front and rear wheels 30 and 32.) Moreover, the brace member 120 can be positioned for assembly at any lateral location along cross-member 72. These positioning capabilities also allow the user to position a bicycle so that other loads such as luggage can be carried by the primary load carrying structure 40 as desired. Alternatively, the user can carry a second bicycle by utilizing a second set of shoes 140 and a second brace member 120 in cooperation with a second cross-member 72 and longitudinal rail member 42, as indicated in FIG. 1.

Portions of second embodiments of a brace member and a wheel fixing structure in accordance with the teachings of the present invention are illustrated in FIGS. 6 and 7. The features of these embodiments which are identical to those of the previously described embodiments are indicated with identical numerical designations. In these second embodiments, the bicycle carrier includes an elongated brace member 180 which is formed from a single strip of metal stock. The brace member 180 includes a foot portion 182 at one end which can be assembled with cross-member 72 by a pair of fastening elements 184 and clamping plates 128 in the same manner as foot portion 122 of brace member 120. The opposite end of brace member 180 is formed to define a frame engaging portion 186 having a suitably sized hole for receiving J-bolt 132 to facilitate assembly of portion 186 with the rear frame member 20 of bicycle 12 in the same manner as frame engaging portion 124 of brace member 120. As shown in FIGS. 6 and 7, the central portion 188 of brace member 180 disposed between foot portion 182 and frame engaging portion 186 is formed with a generally V-shaped cross-section, which provides brace member 180 with an increased modulus to enhance its strength and rigidity. Brace member 180 includes all of the previously noted features and advantages of brace member 120 and differs therefrom only in terms of material and forming process.

A second embodiment of a wheel fixing structure in accordance with the invention is illustrated in FIG. 6. This wheel fixing structure, is defined by a longitudinally extending channel 190 having a bottom portion 192 and a pair of upstanding spaced generally parallel sidewalls 194 and 196. Channel 190 is of a length and width which enables it to receive and locate the front wheel 30 and the rear wheel 32 of a bicycle 12 in generally planar alignment. The channel 190 is adapted to be removably assembled with and supported by a pair of longitudinally spaced cross-members 72 in the manner shown in FIG. 6. To accomplish such assembly, the bottom portion 192 of channel 190 is provided with a pair of through apertures or holes (not shown) for receiving threaded fastening elements similar to elements 184 to effect a threaded assembly with a pair of clamping plates 128 disposed within channels 90 of cross-members 72 in the previously described manner. The channel 190 can therefore be laterally positioned as desired along cross-members 72 in a manner similar to brace members 129 and 180 to allow a bicycle to be laterally located and positioned relative to surface 14 as desired. On the other hand, longitudinal positioning of channel 190 can be achieved either by movement of utility bar assemblies 70 and/or by providing the bottom portion 192 of channel 190 with a plurality of longitudinally spaced apertures to allow the channel 190 to be positioned and attached at a plurality of longitudinal locations.

In this embodiment, the wheel fixing structure is provided with clamping assemblies 198 for securing the front and rear wheels 30 and 32 against longitudinal movement in a manner similar to the previously described clamping assemblies 142. The clamping assemblies 198 illustrated in FIG. 6 are of a strap/clamp type which can be loosely assembled through wheels 30 and 32 and about channel 190, and thereafter tightened as desired. Alternatively, the user could utilize a clamping assembly similar to assembly 142. In any case, channel 190 can be utilized with either type of clamping assembly to cooperate with either brace member 120 or 180 and the bicycle 12 itself to create a simplified but rigid and secure structure which is fixed against lateral or longitudinal movement with respect to the vehicle surface 14. It therefore provides a bicycle carrier possessing all of the previously noted manufacturing, assembling, shipping and use advantages.

Figure 8:
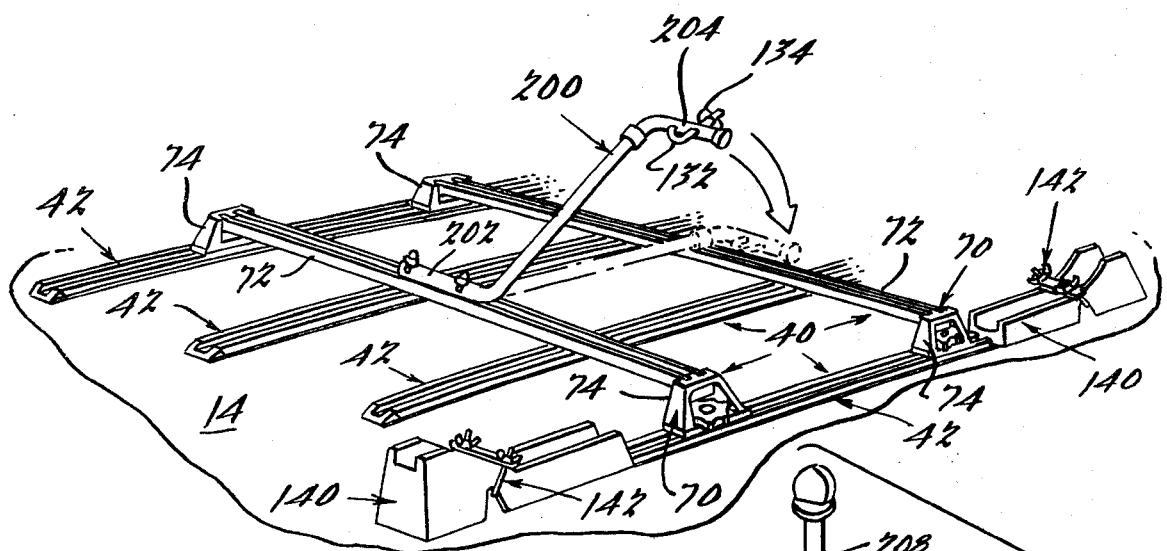
FIG. 8 is a perspective view of a third embodiment of a brace member in accordance with the present invention.
Figure 9:
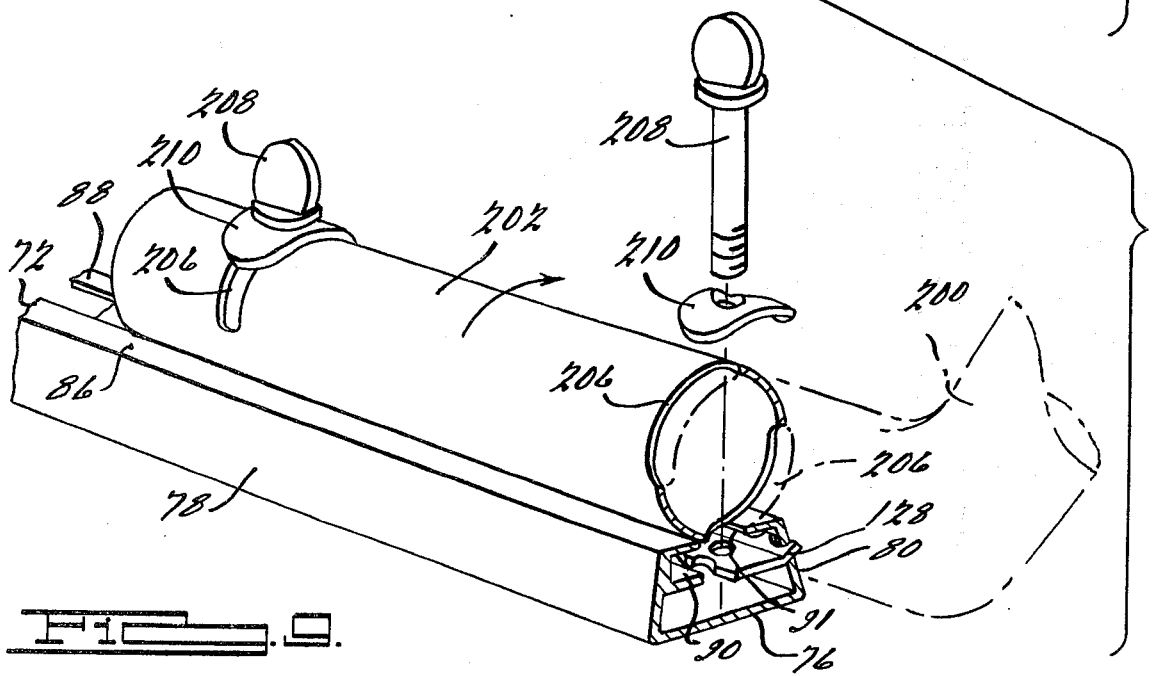
FIG. 9 is an enlarged partially exploded perspective view of the embodiment of FIG. 8, with portions thereof being in section.

Yet another embodiment of a brace member in accordance with the invention is illustrated in FIGS. 8 and 9 at 200. This brace member 200 includes a foot portion 202 and a frame engaging portion 204 which are similar to foot portion 122 and frame engaging portion 124 of brace member 120, and can be formed from a single piece of hollow tubing in a similar manner. Frame engaging portion 204 can likewise be clampingly assembled with rear frame member 20 of bicycle 12 in a similar manner by way of J-bolt 132 and wing nut 134. As shown most readily in FIG. 9, foot portion 202 is provided with two sets of diametrically opposed circumferentially extending slots or apertures 206. Each set of apertures 206 is operative to define an elongated passageway through foot portion 202, which allows foot portion 202 to be assembled to cross-member 72 in a variety of angular positions. Foot portion 202 can be so assembled to cross-member 72 by way of fastening elements 208 and curved or arcuate washers 210 in the manner shown in FIG. 9. To facilitate such assembly, channel 90 of cross-member 72 can be provided with the previously described clamping plates 128. These plates 128 are operative to receive elements 208 through access opening 91 and to cooperate therewith to assemble foot portion 202 to cross-member 72 in the same way as plates 128 and fastening elements 126 cooperate to so assemble foot portion 122 of the previously described embodiment.

These features allow brace member 200 to engage and secure bicycle frames of varying heights. Moreover, they allow brace member 200 to be collapsed or moved into and secured in a storage position such as shown in phantom in FIG. 8 when brace member 200 is not being used to secure a bicycle for vehicle transport. When in this storage position, the brace member 200 will rest upon the two cross-members 72 as shown so as to define a generally low profile configuration which avoids the previously noted wind resistance and vertical clearance problems associated with prioer known devices. These features therefore provide a bicycle carrying device that does not have to be dismantled and removed from the vehicle and stored in some other location in order to accomplish these objectives.

Figure 10:
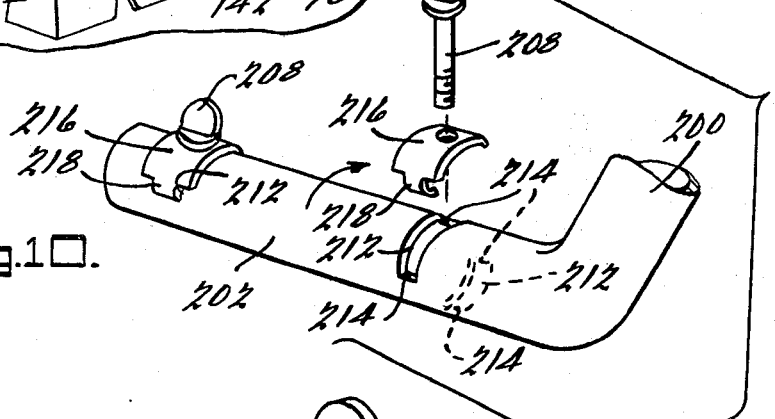
FIG. 10 is a partially exploded perspective view of a portion of a fourth embodiment of a brace member in accordance with the present invention.

FIG. 10 illustrates a variation of brace member 200 wherein foot portion 202 is provided with two sets of diametrically opposed circumferentially extending slots or access openings 212 having squared off ends 214. These slots 212 are intended to cooperate with curved locking washers 216 and fastening elements 208 to effect assembly of foot portion 202 to cross-member 72 in the previously discussed manner. As shown in FIG. 10, each of the locking washers 216 is provided at one end with an elongated tab or tang 218 which is operative to interferingly engage an end 214 of slot 212 to facilitate the locking of brace member 200 in either its operative or its storage position. FIG. 10 illustrates the manner in which washers 216 can be oriented to lock brace member 200 in an operative position. Locking of brace member 200 in a storage position (shown in phantom in FIG. 8) can be achieved simply by reversing the orientation of washers 216.

As is readily apparent, either of the embodiments of FIGS. 8 through 10 can be utilized with either of the previously described wheel fixing structures to cooperate with the bicycle 12 for creating a rigid and secure structure which is fixed against lateral or longitudinal movement relative to vehicle surface 14. They therefore possess the manufacturing, assembling, shipping and use advantages previously set forth.

A further alternative embodiment of the invention is depicted in FIGS. 11–13. The load carrier 300 includes the above described primary load carrying structure 40 which can be utilized to secure and support general types of loads, such as luggage and the like, in a conventional manner, including longitudinally extending rail members 42, utility bar assemblies 70 removeably and adjustably mounted on two of the rail members 42. The utility bar assemblies include laterally extending elongated cross members 72 assembled with and supported by stanchion assemblies 74 adjacent each of its ends. The cross members 72 may be constructed as described above and illustrated by FIG. 5, or a suitable variation thereof, having an elongated channel 90 coextensive with the length of the cross member 72.

The load carrier 300 also includes a bicycle carrier 302 which is operative to be assembled with the primary load carrying structure 40 to facilitate the transport of a bicycle in an upright position above vehicle surface 14 for transport by the vehicle. The carrier 302 includes a brace member 304 which may comprise any of the above described brace members 120 (FIG. 1), 180 (FIG. 7), or 200 (FIGS. 8–10), although the brace member 200 of FIGS. 8 to 10 is the preferred embodiment for brace member 304 as illustrated. An alternative embodiment of the wheel fixing structure 306, however, is illustrated as defined by a longitudinally extending channel 308 having a suitable cross-section, an example of which is illustrated in FIG. 13 having a bottom portion 310 and a pair of upstanding spaced generally parallel sidewalls 312, 314. The sidewalls 312, 314 may comprise, as shown, a lower portion 316, 318, intermediate portion 320, 322, and upper portion 324, 326, with each successive portion having a greater spaced apart distance between the walls 312, 314 as the walls 312, 314 are directed upwardly. Each of the walls 312, 314 also include a rounded top flange 328, 330, respectively. At each end 332, 334 of the channel 308, the channel 308 is turned upwardly to form an integral shoe 336 and 338 at each end 332, 334, respectively, of the channel.

A bicycle 340 can be secured to the carrier 302 by assembling the J-bolt 132 of the brace member 304 to the rear frame member 20 of the bicycle 340 and placement of the front 30 and rear 32 wheels of the bicycle 340 in the shoes 336 and 338, respectively, of the channel 308. Clamping assemblies 348 and 350 are provided for securing the front 344 and rear 346 wheels of the bicycle 340 to the shoe 336, 338 against longitudinal movement. The clamping assemblies 348, 350 illustrated in FIG. 11 are of a strap/clamp type which can be loosely assembled through wheels 30, 32 and about channel 308, and thereafter tightened as desired. Alternatively, the user could employ a clamping assembly similar to assembly 142 (FIGS. 1 and 2). In either case, channel 308 including shoes 336 and 338 could be used with either type of clamping assembly to cooperate with a brace member 304, or the other brace members 120, 180 or 200 described above, and the bicycle 304 itself to create a simple but rigid and secure structure 300 which is fixed against lateral or longitudinal movement with respect to the vehicle surface 14, providing a bicycle carrier 302 possessing all of the previously noted manufacturing, assembling, shipping and usage advantages.

The carrier 302 has the further option, for smaller bicycles, of providing shoes 352 insertable in the channels 308 of the carrier 302 to fit the wheel dimensions of the smaller bicycles. The channel 308 includes a slot 354 and a hole 356 adjacent thereto. The shoes 352 have the same or a similar cross-section to shoes 336, 338 of the channels 308, and are similarly upwardly turned to conform to a portion of the wheel of a bicycle, but also include a pair of upper alignment flanges 358, 360, a tab 362 operably associable in the channel slot 354, and a hole 364 alignable with the adjacent channel hole 356.

When the shoe 352 is placed so that the tab 362 is fully inserted into the slot 354, flanges 358 and 360 align the shoe 352 atop the channel 308, and hole 364 is aligned with channel hole 356. A screw 366 is then inserted through hole 364 into threadable association with channel hole 356 to secure the shoe 352 to the channel. With a smaller bicycle, the brace member 304, channel 308, including shoes 336 and 338, and the smaller bicycle will create the simple but rigid and secure structure of the present invention.

A series of slots 354 and adjacent holes 356 can be provided in channel 308 to provide for the structure 300 to be useable with any size of bicycle available in the marketplace. It should also be noted that the shoes 352 may be utilized with a channel 190 as that illustrated in FIG. 6 having slots and holes therein, rather than having integral shoes 336 or 338, to provide a removeable, adjustable shoe arrangement which would even include the adjustable shoe position for a full sized bicycle.

FIG. 14 illustrates an alternative embodiment of a wheel locating structure 406 utilizing a longitudinally extending channel 408 having a suitable cross-section such as that illustrated in FIG. 13 secured to cross members 72 by suitable fastening means, such as nut 409 in a tap plate within the channel of the cross member 72. At two intermediate positions of the channel 408, slots 410 are disposed in the bottom surface 310 of the channel 408. A block or shoe 412 having a threaded bore 414 is set within the the channel 408. A tie down element 416 of the type that can be used in association with a slat 42 or cross member 72 as described in applicant's U.S. Pat. No. 4,239,139, issued to applicant on Dec. 16, 1980, having a loop portion 418, an annular portion 420, and an extended threaded portion 422, is used to secure the shoe 412 to the channel 408. The extended threaded portion 422 of a tie down element 416 is placed through each of the slots 410 into threaddd engagement with the bore 414 of a shoe 412. The bicycle wheels 30 and 32 are placed in the channel 408, the brace 304 is set in place and secured to the bicycle 340 as described above, and the shoes 412 (with the tie down element 416) are slid into abutting relation along the slot 410 with the respective bicycle wheel 30 or 32. The tie down element 416 is then tightened into the shoe 412 to lock the shoe 412 and tie down element 416 in place as an assembly against one of the wheels 30 or 32. The other tie down element 416 and shoe 412 assembly is similarly abutted against the other bicycle wheel 30 and 32 and tightened to lock the shoe 412 in place against the other wheel 30 or 32. The two shoes 412 act to abuttingly engage the wheels 30 and 32 between the two wheels in an opposed fashion to provide a first element of engagement and securement of the wheel portion 30 and 32 of the bicycle 340 to the channel 408 of the wheel fixing structure 406. A second element of engagement and securement of the wheel portion 30 and 32 of the bicycle 340 to the channel 408 is provided by clamping straps 424 disposed through the loop portion 418 of the tie down element 416 around the channel 408 and one of the wheels 30 or 32 and tightened as needed. The two elements of engagement and securement combine to form wheel engaging means 430 for clampingly engaging and securing each wheel 30 or 32 to the channel 408 of the wheel locating structure 406, comprising a a tie down element 416, a shoe 412 and a clamping strap 424 associated with a channel 408, to create, in association with the brace 304, a simple but rigid and secure structure fixed against lateral or longitudinal movement with respect to the vehicle surface, again providing a bicycle carrier possessing all of the previously noted manufacturing, assembling, shipping and usage advantages.

In each of the previously described embodiments of the invention, it should be noted that the longitudinal rail members 42 are intended as a more or less permanent installation of relatively low profile along vehicle surface 14. This installation allows the utility bar assemblies 70 to be removably attached for creating the primary load carrying structure 40, and the bicycle carrier to be removably attached when and as desired. In this connection, a manufacturer could readily make and sell the primary load carrying structure 40 and the bicycle carrier as separate units, with the bicycle carrier being a separately distributed kit item.

It is understood that the foregoing description is that of the preferred embodiments of the invention and that various changes and modifications may be made thereto without departing from the spirit and scope of the invention, as defined in the appended claims.

What is claimed is:

1. A device for supporting and securing a bicycle having a frame and front and rear wheels in an upright position extending longitudinally above a substantially horizontal surface of a vehicle for transport by said vehicle, said device extending longitudinally in a direction substantially parallel to said bicycle when mounted on said device and extending laterally in a direction substantially perpendicular to said bicycle when mounted on said device and said device comprising a base support secured to said vehicle, first retaining means for engaging said frame to retain said bicycle against lateral movement relative to said vehicle, and second retaining means for engaging said front and rear wheels to retain said bicycle against longitudinal movement relative to said vehicle, said first retaining means being laterally positionable in various operable positions relative to said base support.

2. A device as set forth in claim 1, wherein said first retaining means comprises a laterally extending elongated cross-member which is fixedly supported above said surface in generally parallel relationship thereto, and an elongated brace member which is assembled between said cross-member and said frame to extend generally laterally of said bicycle between said frame and said cross-member and to cooperate with said frame and said cross-member to retain said bicycle against said lateral movement.

3. A device as set forth in claim 2, wherein said brace member includes a frame engaging portion at one of its ends, and said first retaining means further comprises clamping means for effecting a clamped assembly of said frame engaging portion and said frame.

4. A device as set forth in claim 2, wherein said brace member includes a foot portion at one of its ends through which at least one threaded fastener can be driven for assembling said brace member with said cross-member.

5. A device as set forth in claim 4, wherein said brace member can be removably assembled with said cross-member at any lateral location along the length of said cross-member.

6. A device as set forth in claim 2, wherein said brace member can be removably assembled between said cross-member and said frame.

7. A device as set forth in claim 2, wherein said brace member is formed from a single piece of metal tubing.

8. A device as set forth in claim 2, wherein said brace member is formed from a single piece of metal strip stock.

9. A device as set forth in claim 8, wherein said brace member is formed to define a generally V-shaped section along a substantial part of its length.

10. A device as set forth in claim 2, wherein said first retaining means further comprises storage means for moving said brace member into a generally low profile position adjacent and substantially parallel to said surface and securing said brace member in said low profile position.

11. A device as set forth in claim 2, wherein said first retaining means further comprises supporting means for supporting said cross-member above said surface.

12. A device as set forth in claim 11, wherein said cross-member is removably attachable to said supporting means.

13. A device as set forth in claim 11, wherein said supporting means includes positioning means which enables said cross-member to be positioned longitudinally above said surface as desired for support by said supporting means.

14. A device as set forth in claim 11, wherein said supporting means comprises a pair of laterally spaced longitudinally extending rails affixed to said surface, a first stanchion member affixed to one of said rails and which engageably supports one end of said cross-member, and a second stanchion member affixed to the other of said rails and which engageably supports the other end of said cross-member.

15. A device as set forth in claim 14, wherein said first and second stanchion members are movable along said rails to facilitate longitudinal positioning of said cross-member above said surface.

16. A device for supporting and securing a bicycle having a frame and front and rear wheels in an upright position above a substantially horizontal surface of a vehicle for transport by said vehicle, said device extending in a longitudinal direction substantially parallel to said bicycle when said bicycle is mounted on said device and also extending in a lateral direction substantially perpendicular to said bicycle when said bicycle is mounted on said device, said device comprising a base support secured to said vehicle, first retaining means for engaging said frame to retain said bicycle against lateral movement relative to said vehicle, and second retaining means for engaging said front and rear wheels to retain said bicycle against longitudinal movement relative to said vehicle, wherein said first retaining means is longitudinally positionable along said surface relative to said base support.

17. A device as set forth in claim 16, wherein said first retaining means is both laterally positionable and longitudinally positionable along said surface relative to said base support.

18. A device for supporting and securing a bicycle having a frame and front and rear wheels in an upright position above a substantially horizontal surface of a vehicle for transport by said vehicle, said device comprising base support means secured to said vehicle, first retaining means secured to said base support means for engaging said frame to retain said bicycle against lateral movement relative to said vehicle, and second retaining means for engaging said front and rear wheels to retain said bicycle against longitudinal movement relative to said vehicle; wherein said first retaining means is movable between a first operative position for engaging said frame to retain said bicycle against said lateral movement and a second storage position secured to said base support means and having a generally low profile relative to said surface.

19. A device for supporting and securing a bicycle having a frame and front and rear wheels in an upright position above a substantially horizontal surface of a vehicle for transport by said vehicle, said device comprising base support means, first retaining means for engaging said frame to retain said bicycle against lateral movement relative to said vehicle, and second retaining means for engaging said front and rear wheels to retain said bicycle against longitudinal movement relative to said vehicle; wherein said second retaining means comprises one wheel locating means for receiving and locating both the front and rear wheels of said bicycle relative to said surface, and wheel engaging means for engaging and securing said front and rear wheels within said wheel locating means to retain said bicycle against longitudinal movement, said second retaining means being laterally adjustable to selected operable positions relative to said base support means.

20. A device as set forth in claim 19, wherein said wheel locating means comprises an elongated channel for receiving and locating said front and rear wheels in generally planar alignment.

21. A device as set forth in claim 20, wherein said second retaining means further comprises supporting means for supporting said channel above said surface in generally parallel relationship thereto.

22. A device as set forth in claim 21, wherein said channel is removably attachable to said supporting means.

23. A device as set forth in claim 20, wherein said second retaining means further comprises a pair of longitudinally spaced laterally extending elongated cross-members for supporting said channel in generally longitudinal alignment above said surface.

24. A device as set forth in claim 23, wherein said channel is removably attachable to said pair of cross-members.

25. A device as set forth in claim 23, wherein said second retaining means further comprises positioning means for positioning said channel laterally along said pair of cross-members as desired.

26. A device as set forth in claim 20, wherein said wheel engaging means comprises first clamping means for clampingly retaining said front wheel within said channel, and second clamping means for clampingly retaining said rear wheel within said channel.

27. A device as set forth in claim 26, wherein said first clamping means is removably assembled through said front wheel and about said channel, and said second clamping means is removably assembled through said rear wheel and about said channel.

28. A device for supporting and securing a bicycle having a frame and front and rear wheels in an upright position above a substantially horizontal surface of a vehicle for transport by said vehicle, said device comprising at least one slat fixedly mounted to said horizontal surface, first retaining means for engaging said frame to retain said bicycle against lateral movement relative to said vehicle, and second retaining means for engaging said front and rear wheels to retain said bicycle against longitudinal movement relative to said vehicle comprising a first shoe for receiving said front wheel and a second shoe for receiving said rear wheel and which cooperates with said first shoe to locate said front and rear wheels in generally planar alignment each said shoe having a lower part conformably shaped to set upon said horizontal surface and an upper part disposed vertically above said lower part having at least a portion thereof shaped to be arcuately conformably engageable with a portion of one of said bicycle tires; and vertically disposed fastening means for securing each said shoe to said slat extending through said upper and lower parts of each said shoe to slideably attach each said shoe to said slat.

29. A device set forth in claim 28, wherein said first and second shoes are attached to and supported by an elongated longitudinally extending slat disposed along said surface.

30. A device as set forth in claim 29, wherein said first and second shoes are removably attachable to said slat.

31. A device as set forth in claim 29, wherein said slat includes positioning means which enables each said shoe to be positioned longitudinaly along said slat as desired for support by said slat.

32. A device as set forth in claim 28, wherein said wheel engaging means comprises first clamping means for clampingly retaining said front wheel within said first shoe, and second clamping means for clampingly retaining said rear wheel within said second shoe.

33. A device as set forth in claim 32, wherein said first clamping means is removably assembled through said front wheel and about said first shoe, and said second clamping means is removably assembled through said rear wheel and about said second shoe.

34. A device as set forth in claim 33, wherein said first and second clamping means each comprise a U-bolt/-clamping strip assembly.

35. A device as set forth in claim 28, wherein said first and second shoes are integral with said wheel locating means.

36. A device as set forth in claim 28, wherein said first and second shoes are attached to said wheel locating means.

37. A device as set forth in claim 20, wherein said wheel locating means further comprises a first shoe for receiving said front wheel and a second shoe for receiving said rear wheel and which cooperates with said first shoe to locate said front and rear wheels in generally planar alignment.

38. A device as set forth in claim 37, wherein said first and second shoes are attached to said elongated channel.

39. A device as set forth in claim 37, wherein said first and second shoes are integral with said channel.

40. A device as set forth in claim 39, wherein said wheel locating means for receiving and locating the front and rear wheels of a bicycle further includes first and second removeable shoes for locating the front and rear wheels of bicycles smaller than said bicycle.

41. A device as set forth in claim 19, wherein said wheel locating means for receiving and locating the front and rear wheels of said bicycle relative to said surface is adjustable to receive and locate the front and rear wheels of various sizes of bicycles.

42. A device as set forth in claim 19, wherein said wheel locating means for receiving and locating the front and rear wheels of a bicycle further includes removeable means for locating the front and rear wheels of bicycles smaller than said bicycle.

43. A device as set forth in claim 19, wherein said wheel locating means includes a first element having a construction conforming at least in part to an arc of the lower portion of the front wheel of said bicycle and a second element having a construction conforming at least in part to an arc of the lower portion of the rear wheel of said bicycle, which first and second elements cooperate to locate said front and rear wheels in generally planar alignment.

44. A device as set forth in claim 43, wherein said first and second elements are removable.

45. A device as set forth in claim 43, wherein said wheel locating means further includes an elongated channel member and said first and second elements are adjustably secured in various positions along said elongated channel member.

46. A device as set forth in claim 19, wherein said wheel engaging means comprises shoe means disposed within said wheel locating means, a tie down element, and clamping means associated with said tie down element for clampingly retaining a wheel of said bicycle to said wheel locating means.

47. A device for supporting and securing a bicycle having a frame and front and rear wheels in an upright position above a substantially horizontal surface of a vehicle for transport by said vehicle, said device comprising first retaining means for engaging said frame to retain said bicycle against lateral movement relative to said vehicle comprising a laterally extending elongated cross member which is fixedly supported above said surface in generally parallel relationship thereto and an elongated brace member which is assembled between said cross-member and said bicycle frame to extend generally laterally of said bicycle between said bicycle frame and said cross-member and to cooperate with said frame and said cross-member to retain said bicycle against lateral movement, and second retaining means for engaging said front and rear wheels to retain said bicycle against longitudinal movement relative to said vehicle comprising wheel locating means for receiving and locating the front and rear wheels of said bicycle relative to said surface and wheel engaging means for engaging and securing said front and rear wheels within said wheel locating means to retain said bicycle against longitudinal movement, said wheel engaging means comprising a pair of shoe means disposed within said wheel locating means, each shoe means for abutting engagement with one of said bicycle wheels, means for slideably adjusting the position of said shoe means relative to said wheel locating means including a tie down element associated with each shoe means, and clamping means associated with each said tie down element for clampingly retaining each wheel of said bicycle to said wheel locating means.

48. A device as set forth in claim 47, wherein said tie down element includes a threaded portion and said shoe means comprises a block threadably engageable with said threaded portion of said tie down element.

49. A device as set forth in claim 19, wherein said second retaining means is slideably laterally adjustable to selected operable positions relative to said base support means.

50. A device as set forth in claim 17, wherein at least one point on said first retaining means is also vertically rotatably positionable with respect to said base portion.

* * * * *

UNITED STATES PATENT AND TRADEMARK OFFICE
CERTIFICATE OF CORRECTION

PATENT NO. : 4,442,961   Page 1 of 2

DATED : April 17, 1984

INVENTOR(S) : John A. Bott

It is certified that error appears in the above-identified patent and that said Letters Patent is hereby corrected as shown below:

Col. 7, line 28, Delete "clAmping" and substitute --clamping--

Col. 7, line 48, Following "140" insert --for--

Col. 10, line 31, Delete "prioer" and substitute --prior--

Col. 11, line 41, Delete "shoe" and substitute --shoes--

Col. 11, line 51, Delete "304" and substitute --340--

Col. 12, line 37, Delete "threaddd" and substitute --threaded--

Col. 12, line 48, Change "30 and 32" to --30 or 32--

In the Abstract, line 5, Delete "primay" and substitute --primary--

In the Abstract, line 19, following "movement." add -- One version of the wheel fixing structure is a longitudinal channel carried by the utility bars for receiving and properly locating the bicycle wheels, and clamping assemblies which clampingly retain the wheels in the channel. A second version of the wheel fixing structure includes a pair of shoes which are assembled along a rail at longitudinally spaced locations for receiving and properly locating the bicycle wheels, and clamping assemblies which clampingly retain the wheels within the shoes. A third version of the wheel fixing structure includes a pair of shoes which are attached to a longitudinal channel carried by the utility bars for receiving and properly locating the bicycle wheels, and clamping assemblies to clampingly retain the wheels within the shoes. Optional shoes to accommodate smaller bicycles may also be attached to the

UNITED STATES PATENT AND TRADEMARK OFFICE
CERTIFICATE OF CORRECTION

PATENT NO. : 4,442,961

DATED : April 17, 1984

INVENTOR(S) : John A. Bott

It is certified that error appears in the above-identified patent and that said Letters Patent is hereby corrected as shown below:

channels or the shoes may be adjustably attached to accommodate various sizes of bicycles. A fourth version has shoes or blocks engageable with the tires and associated with tie down elements, along with clamping assemblied associated with the tie down elements for retaining the wheels.--

*Signed and Sealed this*

*Twenty-fifth* Day of *December 1984*

[SEAL]

Attest:

Attesting Officer

GERALD J. MOSSINGHOFF

*Commissioner of Patents and Trademarks*